United States Patent [19]

Warner

[11] Patent Number: 5,039,070

[45] Date of Patent: Aug. 13, 1991

[54] ROLL UP JACK STAND

[75] Inventor: Joseph G. Warner, Serling Heights, Mich.

[73] Assignee: U.S. Government as represented by the Secretary of the Army, Washington, D.C.

[21] Appl. No.: 600,881

[22] Filed: Oct. 22, 1990

[51] Int. Cl.[5] .............................................. F16M 13/00

[52] U.S. Cl. ...................................................... 254/94

[58] Field of Search ........................... 254/94, 88, 422; 188/32, 36; 248/352, 188.2

[56] References Cited

U.S. PATENT DOCUMENTS

| | | | |
|---|---|---|---|
| 1,061,658 | 5/1913 | Bradshaw | 254/133 A |
| 1,548,326 | 8/1925 | McDuffie | 254/94 |
| 1,961,659 | 6/1934 | Castaneda | 254/94 |
| 4,034,961 | 7/1977 | Breen | 254/44 |

FOREIGN PATENT DOCUMENTS

| | | | |
|---|---|---|---|
| 244544 | 12/1925 | United Kingdom | 254/44 |

*Primary Examiner*—Robert C. Watson

*Attorney, Agent, or Firm*—Peter A. Taucher; David L. Kuhn

[57] ABSTRACT

The invention is a jack stand for using the device power of a vehicle to raise the vehicle off the ground. The jack stand has a retention device such as a cradle to engage an undercarriage member of the vehicle. The retention device is connected to a post which in turn is mounted to a base plate. The base plate is configured to allow the post to pivot to a vertical position as the vehicle is driven over the jack stand so that the post raises the vehicle.

5 Claims, 3 Drawing Sheets

ROLL UP JACK STAND

The invention described herein may be manufactured. used and licensed by or for the U.S. Government for governmental purposes without payment to me of any royalty thereon.

BACKGROUND AND SUMMARY

My invention relates to the various classes of devices used to lift vehicle off the ground in order to facilitate in situ repair of the vehicle.

My invention is a jack stand having a ground engagement plate and a post mounted to the plate. The post and plate are configured so that the post can engage the axle or other undercarriage member of a vehicle while the post is tilted away from a vertical position. When the vehicle is driven over the jack stand, the post pivots to a vertical position to raise the vehicle.

DETAILED DESCRIPTION

Figure 1:
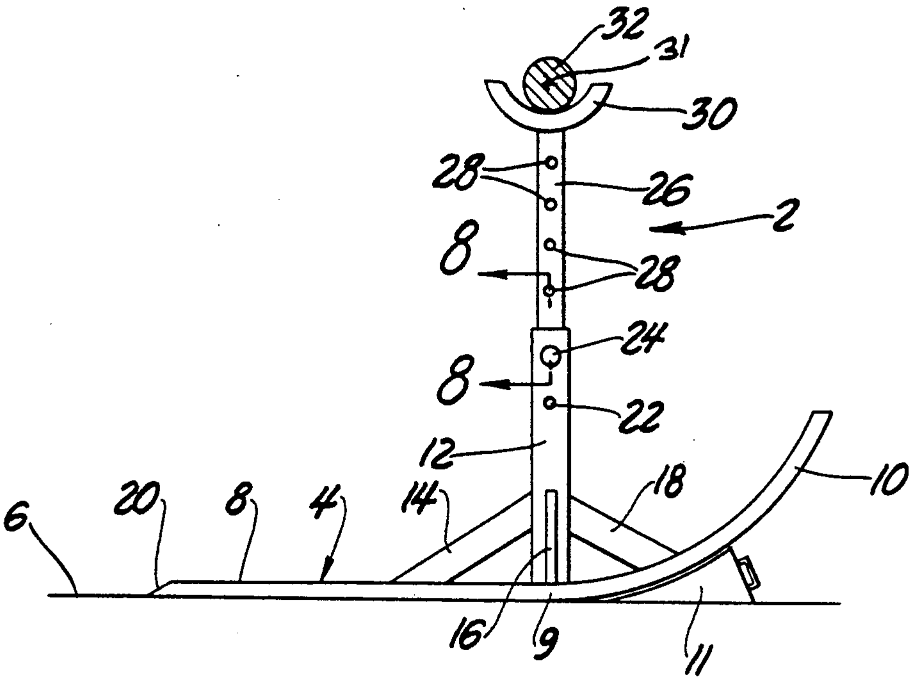
FIG. 1 is a side elevational view of a first embodiment of my jack stand.

FIG. 1 shows a jack stand 2 having base plate 4 resting on a level area of ground or horizontal surface 6, base plate 4 having a flat, planar region 8 and a curved region 10. It may be preferred that the plate is of uniform thickness and that all points on the upper surface of curved region are equidistant from rotational axis 31 of vehicle axle 32. At the end of region 8 is a bevelled digging edge 20 and beneath curved section 10 is a wedge 11 whose upper surface conformingly faces against the underside of region 10. Post 12 is fixed to region 8 at a boundary zone 9 where region 8 meets with region 10. Post 12 being supported by braces 14, 16 and 18, which are fixed between post 12 and base plate 4.

Figure 8:
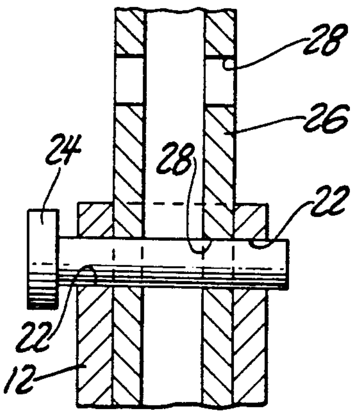
FIG. 8 is a view along line 8—8 in FIG. 1.

As seen in FIGS. 1 and 8, post 12 is a hollow tube defining opposed pairs of apertures 22 therethrough to accommodate a pin 24. Slidably received in post 12 is a hollow cylindrical telescoping member 26 having other opposed pairs of apertures 28 to accommodate pin 24. Any of the opposed pairs of apertures 22 in post 12 may be aligned with any opposed pair of apertures 28 in telescoping member 26, and pin 24 may be inserted through the aligned apertures to fix telescoping member 26 vertically with respect to post 12 in one of several possible positions. Fixed atop member 26 is an upwardly curved cradle 30 for receiving the axle 32 or other undercarriage element of a vehicle (not shown).

Figure 2:
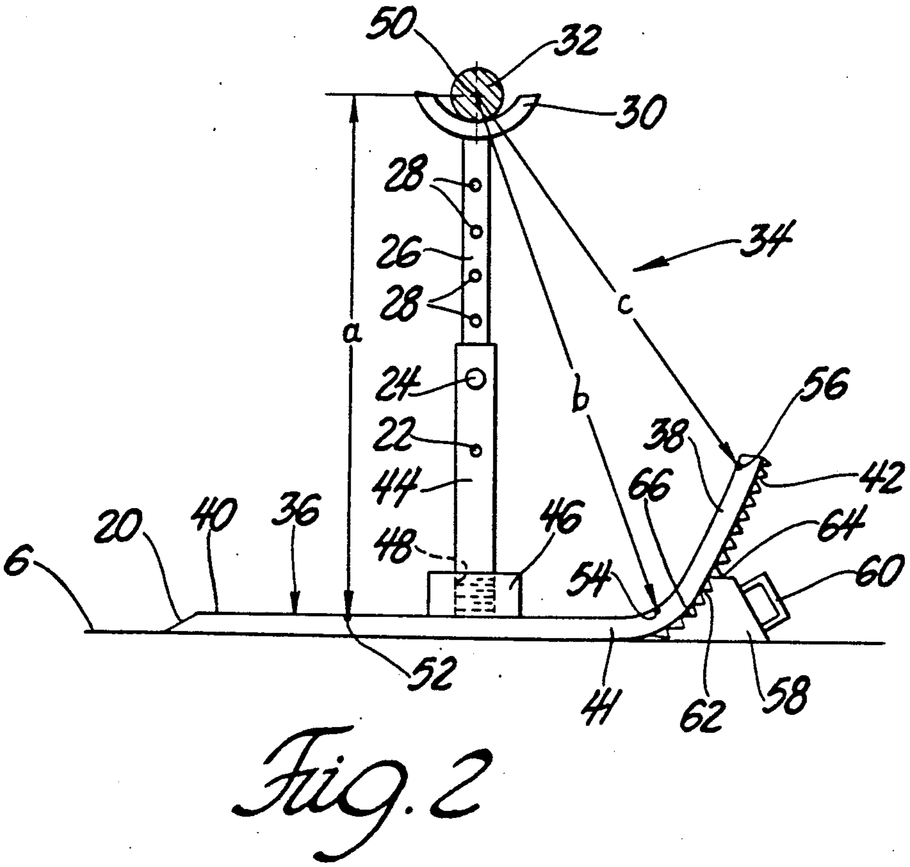
FIG. 2 is a side elevational view of a second embodiment of my jack stand.

FIG. 2 shows a number of optional modifications that may be made to the FIG. 1 jack stand, FIG. 2 having the same reference numbers as in FIG. 1 where elements are the same. The FIG. 2 jack stand is element 34 and has a base plate 36 divided into a curved region 38 and a flat region 40, the boundary between regions 38 and 40 being at zone 41. Fixed to the upper surface of flat region 40 is base block 46 having a threaded aperture 48 for receiving a complementarily threaded end of post 44. Post 44 can be unscrewed from block 46, to dissassemble jack stand 34.

FIG. 2 shows a distance "a" between axis 50 of axle 32 and plate 36, a distance "b" between axis 50 and point 54 on region 38 and a distance "c" between axis 50 and a point 56 at the edge of region 38. For reasons that will be discussed later, distance "b" is greater than either distance "a" or distance "c". The underside 42 has a plurality of teeth for gripping the ground when jack stand 36 is tilted to the right from the FIG. 2 position. Facing underside 42 is the upper surface of wedge 58, which has a handle 60 for ease in manipulating wedge 58 into and from its FIG. 2 position. Wedge 58 has teeth as shown at 62, at least some of the teeth having essentially horizontal tooth surface as shown at top wedge tooth 64. Similarly, at least some of the teeth on underside 42 engaging wedge teeth 62 also have essentially horizontal surfaces, as at 66.

Figure 9:
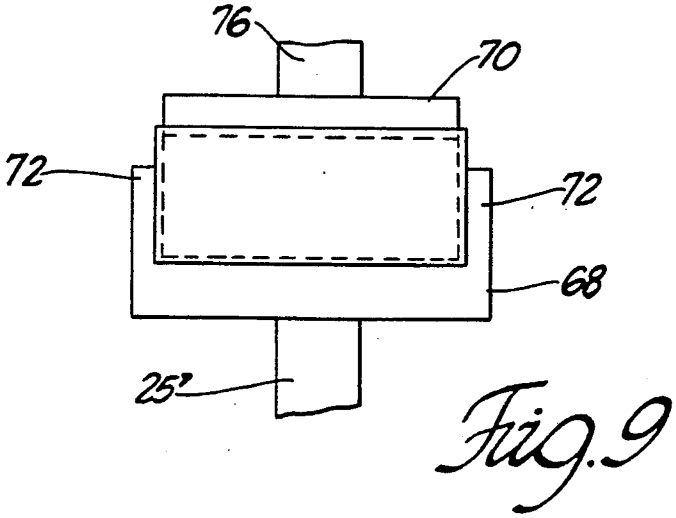
FIG. 9 is a view along line 9—9 in FIG. 7.
Figure 7:
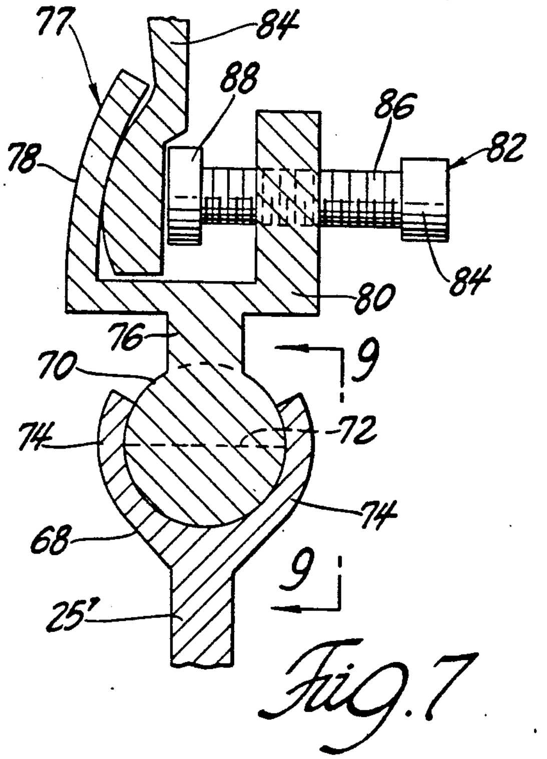
FIG. 7 shows an attachment mechanism which can replace the cradle on any of the three embodiments.

FIGS. 7 and 9 show an optional replacement for cradle 30 in either the FIG. 1 or the FIG. 2 embodiment of my invention. In these figures, the reference numeral 25′ denotes a telescoping member very much like the telescoping member 26 in FIGS. 1 and 2, except that telescoping member 25′ terminates in a socket 68 which rotatingly receives cylinder 70. Curved sidewalls 74 extend two thirds to three quarters of the way around cylinder 70 and socket end walls 72 prevent axial movement of cylinder 70. Neck 76 connects cylinder 70 with bracket 77 having curved wall or arm 78 forming a shallow cup open toward block 80. Passing through block 80 is a locking member 82 having a handle 84, a threaded intermediate section 86 and an engagement head 88. Threaded intermediate section 86 engages a complimentarily threaded aperture through block 80. Head 88 abuts undercarriage element 84 of a vehicle (not shown). element 84 being trapped within bracket 77 by head 88.

Figure 5:
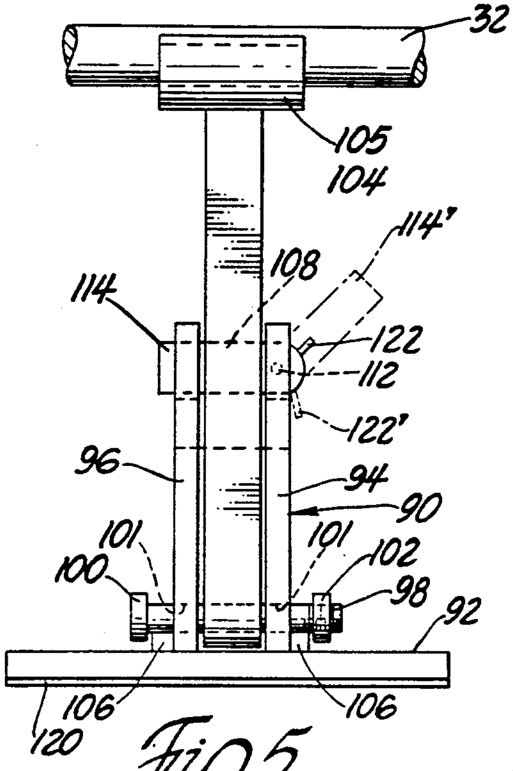
FIG. 5 is a front elevational view of a third embodiment of my jack stand.
Figure 6:
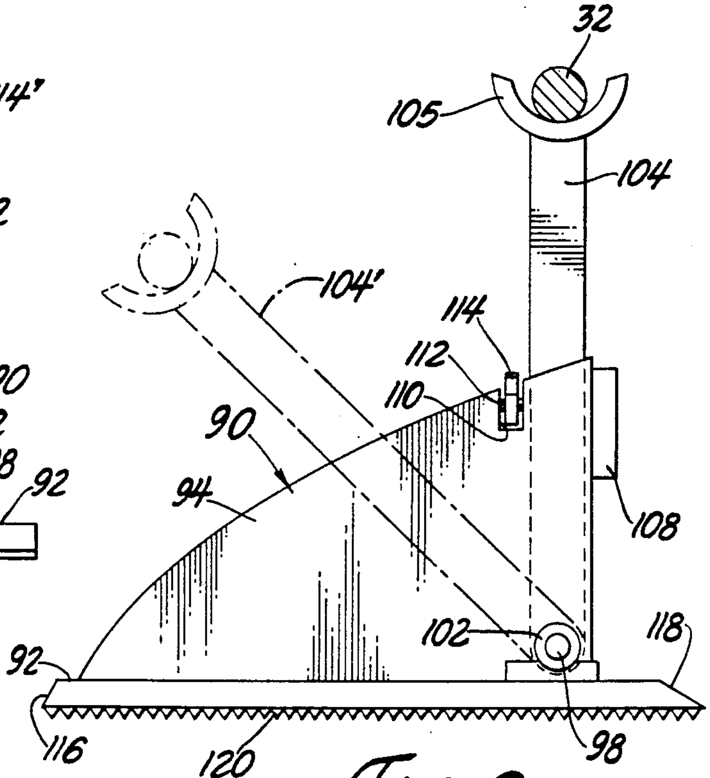
FIG. 6 is a side elevational view of the third embodiment of my jack stand.

FIGS. 5 and 6 show another embodiment 90 of my jack stand having a base 92 on the underside of which are ground engagement teeth 120. Fixed to the upper side of the base are two plate-like uprights 94 and 96. Passing through the uprights is a pin 98 having a head 100 at one end and a nut 102 threaded to the other end. The pin rests not only on the bottoms of through holes 101 defined in the uprights, but also rests upon supports 106.

Between the uprights and pivoted on pin 98 is a one-piece post 104, which optionally can be a length-adjustable two piece structure similar to the assembly of post 12 and telescoping member 26 in the FIG. 1 embodiment. At the free end of post 104 is fixed a semicircular cradle 105 for holding the axle 32 of a vehicle. If desired, the FIG. 7 device can replace cradle 105.

Fixedly connected between the uprights is a rectangular stop plate 108 for limiting the clockwise travel of post 104 as seen in FIG. 6. The uprights each define an upwardly open rectangular slot 110, the slot in upright 94 having dowel 112 extending thereacross. Hinged on dowel 112 is a gate 114, which has a downward or horizontal position wherein it extends through slots 110 to prevent travel of post 104 counterclockwise from its FIG. 6 position.

In FIG. 5, both gate 114 and a tab 122 thereon extend away from the hinge axis of the gate and outward from upright 94, the tab allowing the gate to travel between 120 and 160 degrees clockwise in FIG. 5. The fully clockwise positions of gate 114 and tab 122 are shown in dashed-line form at 114' and 122' respectively. The gate's center of gravity is to the left of the gate's hinge axis as seen at 114 in FIG. 5, so that gravity holds the gate in the FIG. 5 position. Once gate 114 has been pivoted all the way clockwise to 114', its center of gravity will be to the right of the hinge axis of the gate, whereby the weight of gate 114 will keep the gate in the fully clockwise position. In the fully clockwise position, gate 114 will clear post 104 and will extend away from upright 94. The reason for having either gate 114 or tab 122 always extend away from upright 94 is to enable a person using a rod to reach under the vehicle to move the gate with the rod.

OPERATION OF THE VARIOUS EMBODIMENTS

Figure 3:
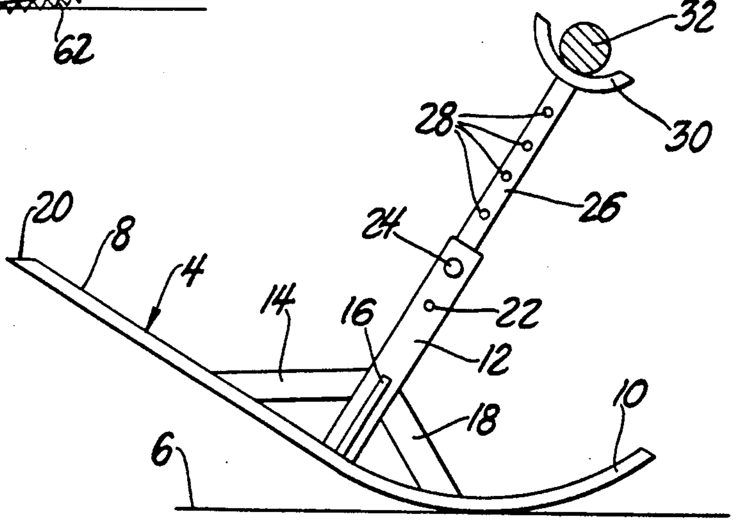
FIG. 3 shows a tilted position of the first embodiment.

The FIG. 1 embodiment of my jack stand is used by first placing it in the position illustrated in FIG. 3, wherein the post 12 is tilted 30 to 45 degrees from the vertical and cradle 30 is engaged with the axle 32 of a vehicle (not shown). The vehicle is then driven to the left as seen in FIG. 3 until post 12 is vertical and flat region 8 of base plate 4 is face to face with horizontal surface 6. The jack stand will then be in the FIG. 1 position and wedge 11 will be placed under curved region 10 of base plate 4 to prevent clockwise rotation of the jack stand. Digging edge 20 prevents leftward creep of the jack stand while the jack stand supports the vehicle.

Figure 4:
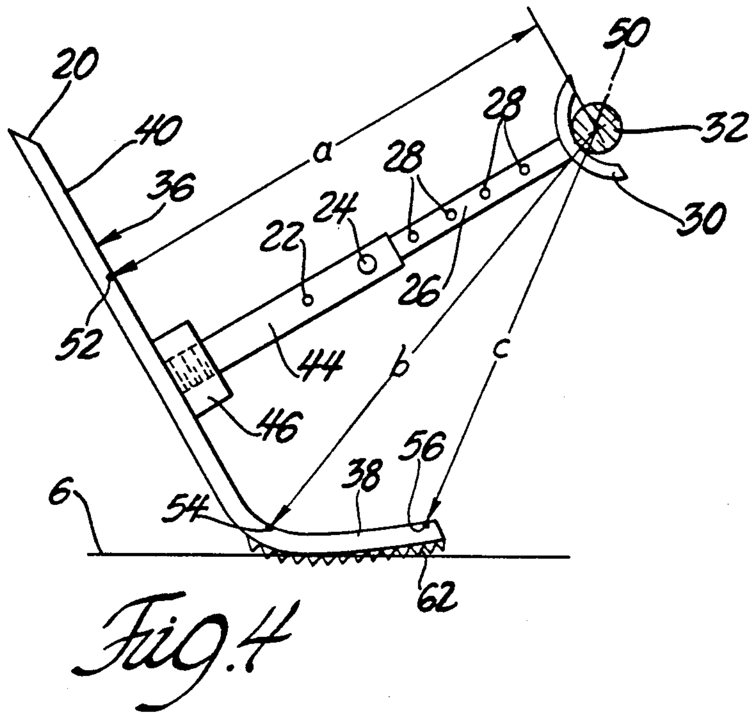
FIG. 4 shows a tilted position of the second embodiment.

The FIG. 2 embodiment of the jack stand is used by first placing it in the FIG. 4 position wherein cradle 30 engages axle 32 of a vehicle (not shown) and curved region 38 of plate 36 grips horizontal surface 6 by means of teeth 62. The vehicle is the driven to the left in FIG. 4 and the jack stand rotates counterclockwise. Since distance "b" is greater than distance "c", axle 32 and the vehicle rise as the jack stand rotates from the FIG. 4 position to a maximum height position where axis 50 is directly over point 54. As the jack stand continues to rotate to its FIG. 2 position, the axle lowers somewhat since distance "a" is less than distance "b". Distance "a" is greater than distance "c", whereby the axle 32 is higher in the FIG. 4 position than it was in the FIG. 2 position. The fact that distance "b" is greater than distance "a" means that the weight of the vehicle will resist clockwise rotation of the jack stand from its FIG. 2 position, thereby stabilizing the jack stand in its FIG. 2 position. When wedge 58 is inserted under curved region 38, the horizontal surfaces on teeth 62 and 64 engage each other so that friction and the horizontalness of these surfaces prevent rightward creep of wedge 58 as seen in FIG. 2.

The FIG. 6 embodiment of my jack stand is used by first placing post 104 in the position illustrated in at 104' wherein post 104 is tilted 30 to 45 degrees from the vertical and cradle 30 is engaged with the axle 32 of the vehicle. Gate 114 is swung clockwise as seen in FIG. 5 so as to be clear of the pivotal path of post 104. The vehicle is driven rightward as seen in FIG. 6 so that post 104 pivots from its position at 104' to its position at 104, further movement being prevented by stop plate 108. Gate 114 is then swung counterclockwise into its FIG. 5 position to hold post 104 upright. Digging edges 116 and 118, and ground engagement teeth 120 prevent base 92 from slipping along the ground during operation of the jack stand.

I wish it to be understood that I do not desire to be limited to the exact details of construction shown and described herein since obvious modifications will occur to those skilled in the relevant arts without departing from the spirit and scope of the following claims.

What is claimed is:

1. A jack stand for using the power of a vehicle to raise the vehicle off a ground surface, comprising:

a base plate for engaging the ground surface, the base plate having a flat, planar region and a curved region joined to the flat region;

a bevelled digging edge on the flat region of the base plate, a telescoping, adjustable-height post extending upwardly from the flat region;

retention means connected to the post for engaging an undercarriage member of the vehicle;

an intermediate segment of the curved region disposed between the flat region and a free end of the curved region, the intermediate segment being further from the undercarriage member than is the free end of the curved region, the intermediate segment also being further from the undercarriage member than is an area of the flat region adjoining the post;

an intermediate zone of the flat region lying between the post and a juncture between the curved region and the flat region, whereby the post is remote from the juncture;

ground engagement teeth on the curved region of the base plate;

a wedge resting on the ground surface insertable between the curved region and the ground surface;

wedge teeth on the wedge, the wedge teeth being meshable with the ground engagement teeth;

horizontal surfaces on the wedge teeth parallel to and bearing against complimentary surfaces on the ground engagement teeth when the flat region of the plate faces against the ground surface;

a socket affixed to the post;

a cylinder closely received in and pivotable in in the socket;

a clamping means rotatable with the cylinder for fixing the undercarriage member relative to the cylinder.

2. The jack stand of claim 1 wherein the clamping means comprises:

a neck fixed to the cylinder;

a block fixed to the neck;

a wall faced toward the block and fixed to the neck;

a locking member having a shaft threadingly engaged to the block and having a head at one end of the shaft, the head disposed between the block and the wall and having a bearing surface opposed to the wall, wherein rotation of the locking member translates the head toward or away from the wall;

one surface of the wall conforming to one side of the undercarriage member and the bearing surface of the head conforming to another, opposite side of the undercarriage member.

3. The jack stand of claim 2 further including means for attaching the post to the flat region, wherein:

the attachment means is a block-like foot fixed to the flat region of the plate, the foot defining a threaded aperture;

the post has a threaded end engaged with the threaded aperture of the foot.

4. A jack stand for using the power of a vehicle to raise the vehicle off a ground surface, comprising:

a base plate for engaging the ground surface, the base plate having a flat, planar region and a curved region joined to the flat region;

a bevelled digging edge on the flat region of the base plate.

a telescoping, adjustable-height post extending upwardly from the flat region;

retention means connected to the post for engaging an undercarriage member of the vehicle;

an intermediate segment of the curved region disposed between the flat region and a free end of the curved region, the intermediate segment being further from the undercarriage member than is the free end of the curved region, the intermediate segment also being further from the undercarriage member than is an area of the flat region adjoining the post;

an intermediate zone of the flat region lying between the post and a juncture between the curved region and the flat region, whereby the post is remote from the juncture;

ground engagement teeth on the curved region of the base plate;

a wedge resting on the ground surface insertable between the curved region and the ground surface;

wedge teeth on the wedge, the wedge teeth being meshable with the ground engagement teeth;

horizontal surfaces on the wedge teeth parallel to and bearing against complimentary surfaces on the ground engagement teeth when the flat region of the plate faces against the ground;

means mounted atop the post for cradling an axle of the vehicle, the cradling means comprising an elongate, generally semi-cylindrically shaped cup open at both ends.

5. The jack stand of claim 4 wherein:

the attachment means is a block-like foot fixed to the flat region of the plate, the foot defining a threaded aperture;

the post has a threaded end engaged with the threaded aperture of the foot.

* * * * *